US009542800B2

(12) United States Patent
Muskin

(10) Patent No.: US 9,542,800 B2
(45) **Date of Patent: *Jan. 10, 2017**

(54) WAGERING GAME WITH CONCEALED ELEMENTS CONTINUOUSLY REVEALED

(71) Applicant: Jon Muskin, Huntingdon Valley, PA (US)

(72) Inventor: Jon Muskin, Huntingdon Valley, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/769,804

(22) Filed: Feb. 18, 2013

(65) Prior Publication Data

US 2013/0260851 A1 Oct. 3, 2013

Related U.S. Application Data

(63) Continuation of application No. 13/163,511, filed on Jun. 17, 2011, now Pat. No. 8,376,824, which is a continuation of application No. 12/695,705, filed on Jan. 28, 2010, now Pat. No. 7,967,673, which is a continuation of application No. 10/926,456, filed on Aug. 26, 2004, now Pat. No. 7,666,080, which is a continuation-in-part of application No. 10/689,027, filed on Oct. 21, 2003, now Pat. No. 7,520,807.

(51) Int. Cl.

| | |
|---|---|
| ***G06F 17/00*** | (2006.01) |
| ***G06F 19/00*** | (2011.01) |
| ***G07F 17/32*** | (2006.01) |
| ***G07F 17/34*** | (2006.01) |
| *A63F 1/00* | (2006.01) |

(52) U.S. Cl.

CPC ............. *G07F 17/323* (2013.01); *G07F 17/32* (2013.01); *G07F 17/3293* (2013.01); *G07F 17/34* (2013.01); *A63F 2001/005* (2013.01)

(58) Field of Classification Search

CPC .... G07F 17/32; G07F 17/323; G07F 17/3293; G07F 17/34; A63F 2001/005

USPC ...................... 463/16–20, 25, 29–31, 40–42

See application file for complete search history.

(56) References Cited

U.S. PATENT DOCUMENTS

| | | | | |
|---|---|---|---|---|
| 1,527,929 | A * | 2/1925 | Simons | 273/139 |
| 4,560,161 | A * | 12/1985 | Hamano | 463/13 |
| 5,042,818 | A * | 8/1991 | Weingardt | 463/13 |
| 5,100,139 | A * | 3/1992 | Di Bella | 273/292 |
| 5,401,023 | A * | 3/1995 | Wood | 463/13 |
| 6,102,798 | A * | 8/2000 | Bennett | 463/16 |
| 6,149,157 | A * | 11/2000 | Suan | 273/292 |
| 6,190,255 | B1 * | 2/2001 | Thomas et al. | 463/20 |
| 6,371,851 | B1 * | 4/2002 | Singer et al. | 463/13 |
| 6,457,714 | B1 * | 10/2002 | Feola | 273/274 |
| 6,550,771 | B1 * | 4/2003 | Weaver et al. | 273/292 |
| 6,632,141 | B2 * | 10/2003 | Webb et al. | 463/25 |
| 6,669,559 | B1 * | 12/2003 | Baerlocher et al. | 463/16 |
| 6,676,126 | B1 * | 1/2004 | Walker et al. | 273/139 |
| 6,739,970 | B2 * | 5/2004 | Luciano | 463/18 |
| 7,017,909 | B1 * | 3/2006 | Awada | 273/292 |

(Continued)

*Primary Examiner* — Milap Shah

(74) *Attorney, Agent, or Firm* — Muskin & Farmer LLC

(57) ABSTRACT

A method, apparatus, and computer readable storage medium for implementing a bonus round of a slot machine game. A plurality of concealed elements are displayed, and a player can reveal each element one by one, until a terminating symbol is revealed. Combinations are formed and a player is awarded a highest combination upon revealing a terminating symbol.

1 Claim, 5 Drawing Sheets

(56) References Cited

U.S. PATENT DOCUMENTS

| | | | | |
|---|---|---|---|---|
| 7,416,186 | B2 * | 8/2008 | Walker et al. | 273/292 |
| 7,500,673 | B2 * | 3/2009 | Arias, III | 273/260 |
| 7,666,080 | B2 * | 2/2010 | Muskin | 463/13 |
| 7,967,673 | B2 * | 6/2011 | Muskin | 463/13 |
| 8,376,824 | B2 * | 2/2013 | Muskin | 463/13 |
| 2002/0119813 | A1 * | 8/2002 | Colin et al. | 463/11 |
| 2003/0073477 | A1 * | 4/2003 | Baerlocher et al. | 463/16 |
| 2003/0119580 | A1 * | 6/2003 | McClintic et al. | 463/25 |
| 2003/0195028 | A1 * | 10/2003 | Glavich | 463/16 |
| 2004/0082376 | A1 * | 4/2004 | Baerlocher et al. | 463/16 |
| 2005/0107148 | A1 * | 5/2005 | Webb | 463/13 |
| 2006/0025190 | A1 * | 2/2006 | Kraft et al. | 463/13 |
| 2006/0079314 | A1 * | 4/2006 | Walker et al. | 463/20 |

* cited by examiner

WAGERING GAME WITH CONCEALED ELEMENTS CONTINUOUSLY REVEALED

CROSS REFERENCE TO RELATED APPLICATIONS

This application is a continuation of application Ser. No. 13/163,511, which is a continuation application of application Ser. No. 12/695,705, which is a continuation application of application Ser. No. 10/926,456, which is a continuation in part application of application Ser. No. 10/689,027. All four of these applications (Ser. Nos. 13/163,611; 12/695,705; 10/926,456; 10/689,027) are incorporated by reference in their entireties for all purposes.

BACKGROUND OF THE INVENTION

Field of the Invention

The present invention is directed to a method, device, and computer readable storage medium for implementing improved variations of video poker games.

Description of the Related Art

Video poker is a popular gambling game found in casinos.

What is needed is a new variety of the game that can be more profitable for the casino, as well as in a form that some players may prefer over the standard game.

SUMMARY OF THE INVENTION

It is an aspect of the present invention to provide improvements and innovations in video poker games, which increase player enjoyment and casino profitability.

The above aspects can be obtained by a method that includes (a) displaying a plurality of concealed elements; (b) allowing a player to select one or more of the concealed elements; (c) unconcealing the selected one or more elements; (d) forming a combination with the selected unconcealed elements; and (e) determining if the formed combination is one of a predetermined combination.

The above aspects can also be obtained by a method that includes (a) cycling through a plurality of game situations of a game; (b) computing game information based on each of the game situations; and (c) storing the game information on a storage medium.

The above aspects can also be obtained by a method that includes (a) cycling through a plurality of game situations of a game; (b) computing game information based on each of the game situations; and (c) storing the game information on a storage medium.

The above aspects can also be obtained by a method that includes (a) determining an initial poker hand and selected cards of the initial hand; (b) accessing a computer readable storage storing a plurality of initial video poker hands and selected cards for the initial hands along with a respective paytable; and (c) retrieving an appropriate paytable from the storage using the initial poker hand and the selected cards.

The above aspects can also be obtained by a method that includes (a) determining a current game situation; (b) accessing a computer readable storage storing a plurality of predetermined game situations; and (c) retrieving and displaying an appropriate payout from the storage using the current game situation.

The above aspects can also be obtained by a method that includes (a) receiving a wager; (b) displaying a static paytable; (c) dealing an initial hand; (d) displaying a dynamic paytable which updates based on a player's selected hold cards in the initial hand; (e) replacing non-hold cards to create a final hand; (f) determining a rank of the final hand; (g) paying the player the rank's respective payout in the static paytable multiplied by the wager; and (h) paying the player the rank's respective payout in the dynamic paytable multiplied by a percentage of the wager.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Further features and advantages of the present invention, as well as the structure and operation of various embodiments of the present invention, will become apparent and more readily appreciated from the following description of the preferred embodiments, taken in conjunction with the accompanying drawings of which.

DESCRIPTION OF THE PREFERRED EMBODIMENTS

Figure 1:
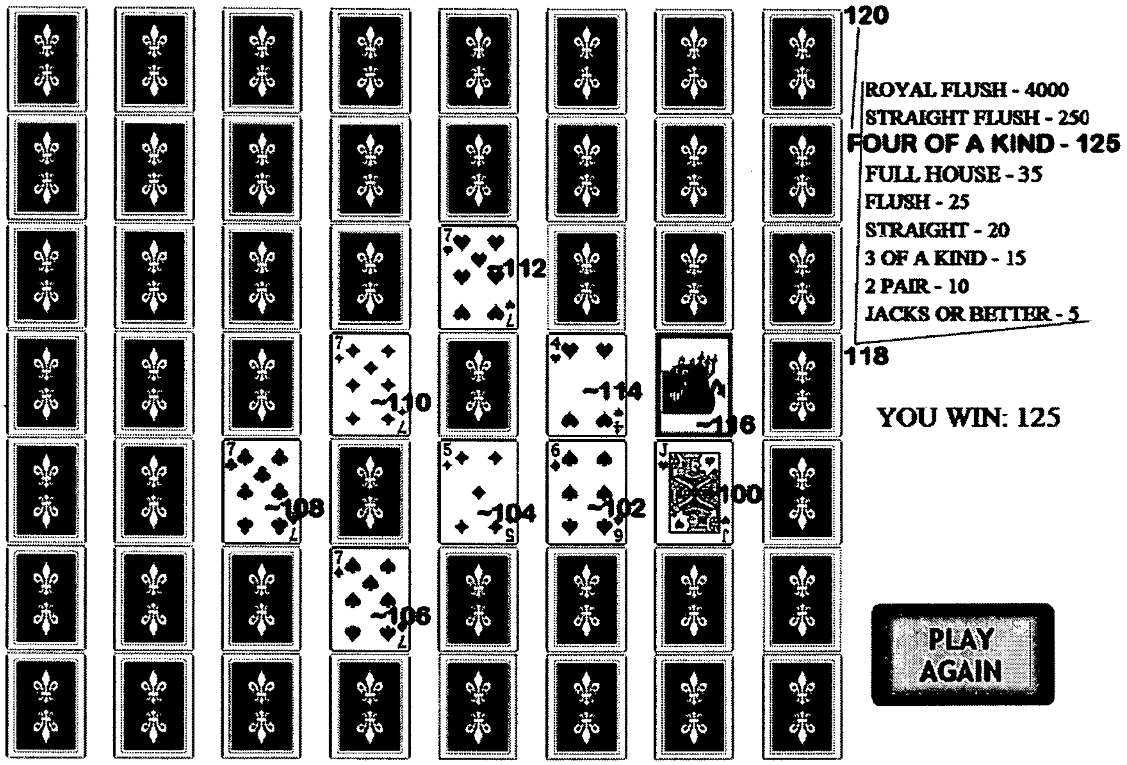
FIG. 1 is a screen shot illustrating an embodiment of the present invention.

Reference will now be made in detail to the presently preferred embodiments of the invention, examples of which are illustrated in the accompanying drawings, wherein like reference numerals refer to like elements throughout.

The present invention relates to video poker games and slot machines and improvements thereof.

In a first embodiment of the present invention, a bonus game is implemented within a video poker game. A bonus game is a game which is a special game triggered by a certain condition. The special game allows the player a chance to win additional money. Examples of a triggering condition are: receiving a particular hand (i.e. a flush), getting dealt a particular (or $53^{rd}$) card, or even just according to a random number generator.

The game displays all 52 cards in a deck (although all 52 cards do not have to be displayed), face down (concealed). In addition to the 52 standard cards, there are additional undesirable (for the player) termination cards which terminate the bonus game. The player continuously turns cards over (unconceals) one by one, by selecting them. The player is awarded the best possible 5 card hand from all of the elements (in this case cards) that are turned over. Turning cards over continues until a termination card is uncovered (or other terminating condition), or the player has made the highest hand (or combination) possible (typically a royal flush).

FIG. 1 is a screen shot illustrating an embodiment of the present invention.

Cards 100, 102, 104, 106, 108 are turned over in sequence. A sixth card 110 is then turned over. Note that between the six unconcealed cards, the best 5 card hand comprises "three of a kind" (three 7's). Thus, the bonus round will pay the player at least 15 coins (or units), according to paytable 118.

The player then turns over a seventh card 112. The best four card hand that can be made is now four of a kind (four sevens), and the bonus round now pays 125. The bonus amounts in this embodiment are not cumulative (i.e. the 15 payout on the three of a kind is not relevant any longer), but the payouts can be cumulative as well.

An eight card 114, and a ninth card 116 are turned over (unconcealed). The ninth card 116 is a "termination card" and ends the bonus round. The termination card can have some type of unpleasant indicia such as a devil.

Once the bonus round is over, the player is paid on the best 5 card (or any number of cards) hand the player can create. Note that the payouts on the paytable 118 do not have to correspond to the paytable on the standard game.

Of course, the player will wish to turn over as many cards as possible until the player can attain the highest ranking possible (a royal flush), before getting a termination card.

Figure 2:
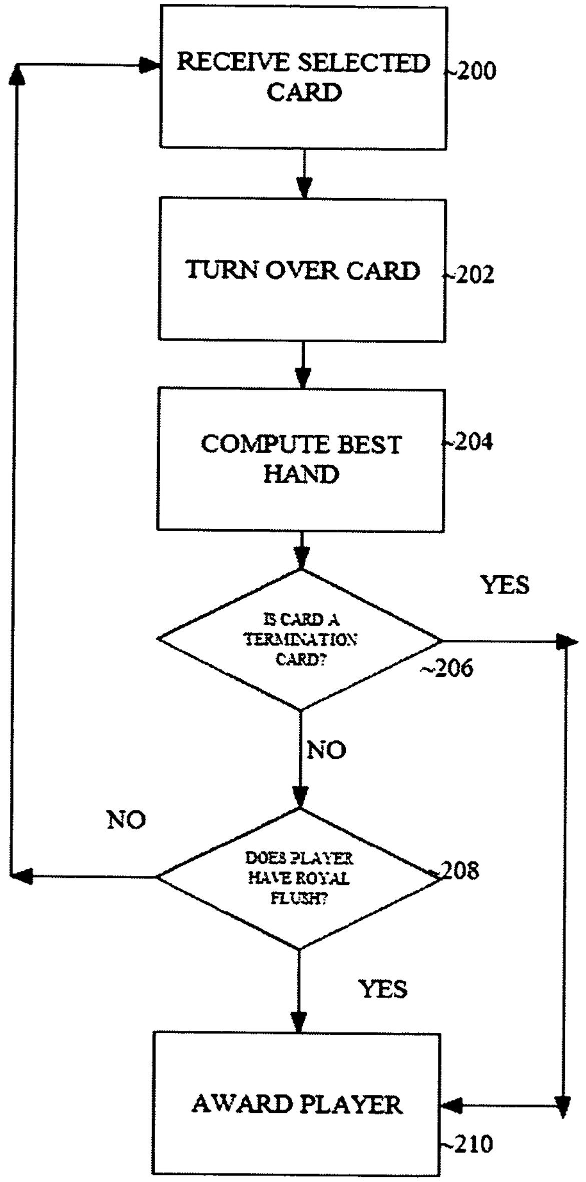
FIG. 2 is a flowchart illustrating a method of implementing the present invention, according to an embodiment of the present invention.

FIG. 2 is a flowchart illustrating a method of implementing the present invention, according to an embodiment of the present invention.

The method starts in operation 200 wherein the game receives the selected card. The player can select the card using a mouse or touch screen, or any other input device.

The method then proceeds to operation 202, wherein the game turns over (unconceals) the selected card.

The method then proceeds to operation 204, which computes the best hand (or other combination is this is used in a traditional slot game) from the unconcealed elements (cards). The best combination is typically highlighted to the player.

This can be done in numerous ways. One possible way is to maintain an array (or matrix) of card composition (i.e. cards left in a deck). For each card uncovered, that card is added to the matrix. A routine can be implemented which computes all possible winning hands from the deck composition matrix (see the fast0 function in Appendix A), and the highest ranking winning hand computed can be used as the highest possible hand.

From operation 204, the method then proceeds to operation 206, which checks if the last card turned over is a termination card.

If the check in operation 206 determines the last card turned over is a termination card, then the method proceeds to operation 210 which rewards the player for the highest computed combination and ends the bonus round.

If the check in operation 206 determines that the last card turned over is not a termination card, then the method returns to operation which then allows the player to choose a new card and continue the bonus round.

The above described methods are not just limited to a video poker game, can also be used for a bonus game on any kind of slot machine. Bonus games on slot machines are typically triggered by a number of different conditions, such as getting particular symbols to appear, etc. Instead of cards, slot symbols (or any other elements) can be used instead. An element can be considered to be an icon with a value or meaning (i.e. a card, slot symbol, etc). Thus, a player can continue to choose elements which are unconcealed to reveal symbols (i.e. diamonds, 7's, or any slot symbol), and winning combinations from the symbols can be created. Each time a new symbol (or element) is unconcealed, the computer determines the best winning combination from all of the possible winning combinations possible from the unconcealed elements. The player is typically awarded the best possible winning combination.

Thus, in the manner described above, the player gets excitement of having a chance to get a large payout (i.e. a royal flush or other slot machine jackpot). Since all of the 52 cards are displayed, the player knows that it is possible to get the royal flush. Similarly, a large selection of slot machine symbols (concealed at first) can be displayed which the player picks randomly. A large jackpot (i.e. 7 7 7) can be possible, thus giving players the excitement of possibly hitting something big. Player's also feel in control in that they choose the symbols and have power to affect the outcome, unlike the standard slot game which is entirely automated.

The value of the described bonus game can be computed mathematically in numerous ways. One way is to perform a computer simulation. For example, in the video poker embodiment, a large number of games can be run with the computer choosing random cards. The frequency of the highest outcome of each game can be tabulated. Then, each payout can be multiplied by its respective frequency and summed. This would give the average dollar amount of the bonus round. Of course, a video poker paytable may need to be reduced in some respect in order to pay for the bonus round.

Appendix A is one example of a computer program (written in Macromedia Flash, although any other programming language can be used) to implement the bonus round described above utilizing video poker.

While FIG. 2 applies to video poker, the same principle illustrated therein can be applied to a slot machine bonus round, substituting concepts related to video poker for slot machine concepts (i.e. instead of a royal flush, the highest jackpot).

In a further embodiment of the present invention (whether applied to video poker, a slot game, etc.) multiple winning combinations can be paid. As described above, only the highest winning combination is paid on the bonus game. Alternatively, all (or some) winning combinations can be paid to the player when formed. This can be accomplished by not just taking the highest combination revealed, but awarding all (or some) of all winning combinations revealed.

In a further embodiment of the present invention, a video poker game can be implemented which allows a player to increase the player's bet after the player has viewed his or her cards on the initial deal (and possibly after the player has determined which cards to discard).

Previously was described a method wherein paytables are computed dynamically based on the instant circumstances (cards dealt, cards held). Also was mentioned that paytables can be precomputed and stored and retrieved based on these conditions.

Figure 3:
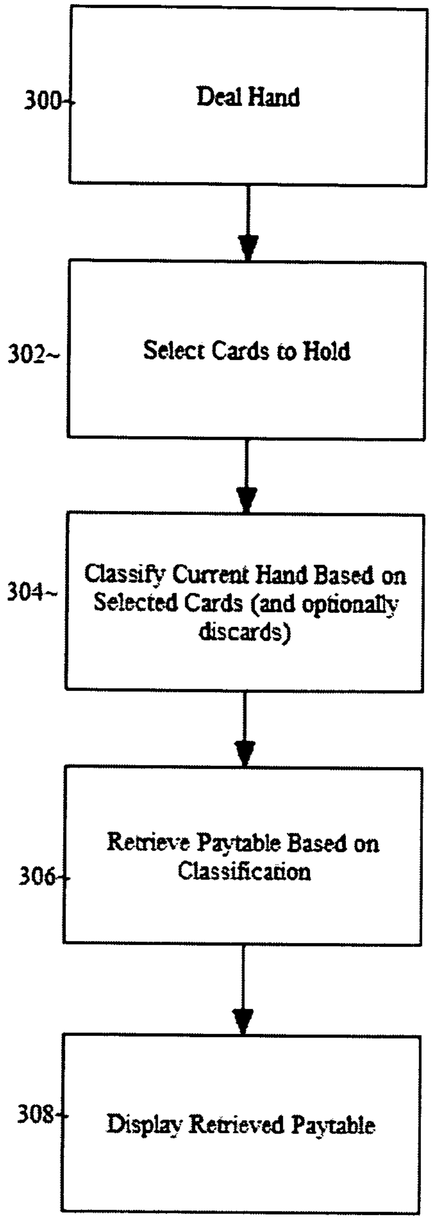
FIG. 3 is a flowchart illustrating a method of implement the present invention, according to an embodiment of the present invention.

FIG. 3 is a flowchart illustrating a method of implement the present invention, according to an embodiment of the present invention.

The method starts with operation 300 which deals a hand.

The method proceeds to operation 302, wherein the player selects which cards the player wishes to hold.

The method then proceeds to operation 304, wherein the current situation is classified, based on the cards dealt and the cards held.

The method then proceeds to operation 306, which retrieves the paytable based on the classification.

The method then proceeds to operation 308, which displayed the retrieved paytable.

In this manner, paytables do not have to be computed dynamically. Of course, this method results in a less accurate return, as there are about 180,000 unique initial kinds of deals, and 32 ways to play each of these deals. If a paytable is prestored for each of the 180,000 hands (and 32 ways to play), then the method could be quite accurate.

However, it is recommended for simplicity that hands be categorized into a more manageable 100 or so classifications, which can include cards which are held and penalty cards. Alternatively, the invention can be implemented wherein classifications do not consider penalty cards. Alternatively, the invention can be implemented wherein the classifications do not consider which cards are held/discarded. Preferably, classifications consider the cards held (0, 1, 2, 3, 4, 5) and the cards discarded.

Examples of classifications can be: four to a royal, 3 to a royal, four to an inside straight, 3 to an outside straight, 3 to a flush (no high cards), 3 to a flush (with on high card), etc. The classifications can also include cards which are discarded, because discards can also be considered "penalty cards" and can affect the overall return. For example, if the player has four to a royal and discards a card with the same suit, the player's chances of getting a flush (but not the royal flush) are decreased slightly because there is one less card of that suit remaining in the deck.

A table of classifications can be created such as that in Table I:

TABLE I

| Kept Card(s) | Penalty Card(s) |
|---|---|
| Four to a royal | card of same suit |
| Four to a royal | high card |
| Three of a kind | |
| Four to an inside straight flush | none |
| Four to an inside straight flush | card of same suit |
| Four to an inside straight flush | high card |
| Four to an inside straight flush | high card and card of same suit |
| Four to an outside straight flush | none |
| Three to a royal | 1) high card; 2) card of same suit |

The examples in Table I are only for illustrative purposes, but many more examples would typically need to be included. Each classification can have a paytable associated with it. Note that cards listed in the penalty card column can comprise more than one penalty card. For example, in the last entry, there would be two penalty cards (3 cards are held), one penalty card is a high card and one penalty card is a card of the same suit. A penalty card can also comprise a plurality of these characteristics, i.e. a high card and a card of the same suit.

Figure 4:
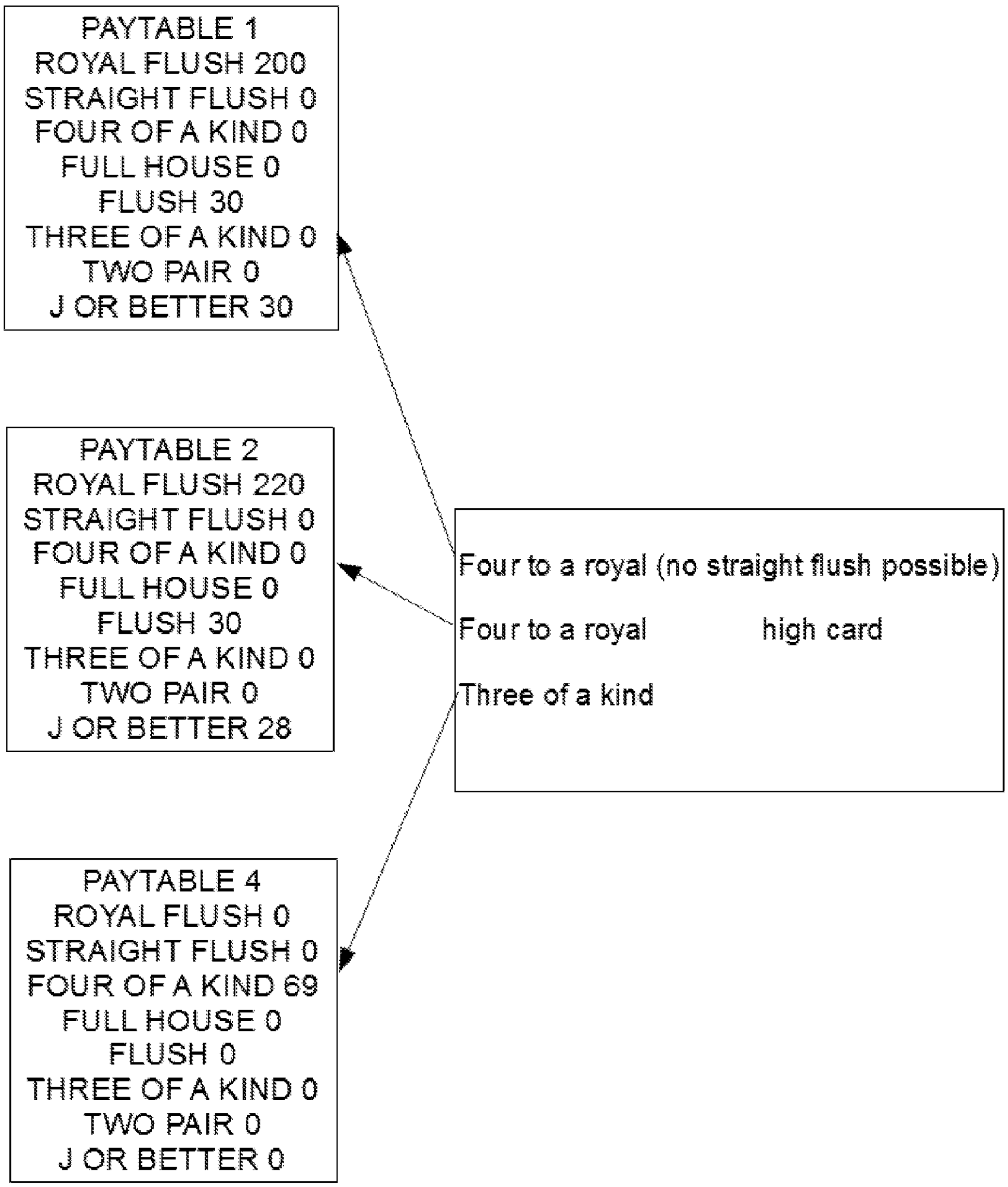
FIG. 4 is a block diagram illustrating an example of a computer record, according to an embodiment of the present invention.

FIG. 4 is a block diagram illustrating an example of a computer record, according to an embodiment of the present invention.

A classification table 406 contains a plurality of hand classifications. Each hand classification then points to a respective paytable 1 400, paytable 2 402, and paytable 3 404.

The table of classifications can alternatively list a category of hand, and penalty cards and/or particular discards or categories of discards. For example, a four to a spade royal can be the category, and a 10 of hearts can be the discard.

In a further embodiment, initially dealt hands can be indexed according to each hand itself. For example, there are 2,598,960 unique initial hands. This can optionally be broken down into about 180,000 different (or relevant) types of hands. For example, being dealt a five card diamond royal flush is essentially the same for analytical purposes as being dealt a five card spade royal flush.

The initial hands can be indexed according to the initial hand. For example, a five card initial hand can be converted to an index number. This can be performed in a variety of ways, such as a hash function, binary encoding, exponential multiplication, etc. For example, a 25 bit number can represent the hand, and each of the 5 groups of 5 bits represents the value for each card (1-52). While this method leaves empty space (53-64), this is just one simple and quick method of indexing cards, while other methods can be used as well. Once an index number is determined, respective information can be stored alongside or associated with that index number (for example a pointer for each index number can point to a memory allocation for the respective information for that index number).

If hands are reduced into the more relevant hands (i.e. 180,000 or so), then these can still be indexed. Redundant hands can be indexed according to the one relevant situation. For example, a player is dealt A clubs, 2 clubs, 3 clubs, 4 clubs, 6 clubs. The same card values but with all hearts instead of all clubs would typically have the same properties. Thus the latter hand can be indexed as the former, in order to reduce the size of indexes needed (and possible respective storage space as well).

Once an index number is assigned to a hand, then a paytable record can be associated with it. The paytable record can include a paytable for each of the 32 discard strategies. The paytable record can also optionally include multiple paytables for different desired returns (chosen by the operator).

All of the methods previously described to generate paytables can be used to pregenerate, index, and store paytables on a storage medium for later use.

Table II represents a simple example of storing initial hands, selected cards, and paytables.

TABLE II

| Index | Hand | cards selected | paytable |
|---|---|---|---|
| 1 | 10h 8h 7c 9d As | 0 0 0 0 0 | 20,000/15,000/2400/400/290/140/30/18/8 |
| 1 | 10h 8h 7c 9d As | 1 0 1 1 0 | 0/0/0/0/0/57/140/50/65 |
| . | | | |
| . | | | |
| . | | | |
| 2 | Js 10c 10s 9s Kh | 1 0 0 0 0 | 0/0/1031/340/600/370/30/14/5 |
| 2 | Js 10c 10s 9s Kh | 1 0 0 0 1 | 0/0/2100/550/0/250/45/20/5 |

In table II, the "hand" column represents a starting hand, "cards selected" represents which cards are going to be held (0 is discarded while 1 is held), and the "paytable" represents the paytable for a Jacks or better game. Each hand can be associated with an index, which can be computed as described above, or any other way known in the art to index a plurality of values. When an initial hand is dealt, and the selected cards are known, the index can be computed and then the appropriate paytable can be retrieved using the index and the selected cards. Alternatively, the index can be computed using both the hand and the cards selected, thus each unique situation has its own index.

In the manner described in the previous paragraph, paytable computations "on the fly" can be avoided, thus satisfying regulatory authorities that may require discrete payouts for game approval.

In the manner described above, paytables do not have to be calculated "on the fly" but can be prestored (on a RAM, ROM, CD-ROM, DVD-ROM, or any known storage medium) and immediately retrieved. This may be preferred for regulatory purposes if regulators prefer to see stored paytables versus paytables computed formulaically.

For regulatory purposes, a storage medium can be produced which contains any, all, or any combination of the following: initial hands, respective playing strategies for the initial hands, respective paytables for that discard strategy, and a return for the respective paytable(s). A medium may also just contain all possible paytables that can be used and their returns.

The data on the storage medium can be summarized to include: the average % return of the paytables, the highest and/or lowest % return on a paytable, etc. If the lowest % return of all the possible paytables is above a predetermined minimum for regulatory approval, then the game should be approved.

In yet a further embodiment of the present invention, the second paytable can comprise the first paytable added to the doubled component. Previously described was a second paytable which was independent of the first paytable. However, the first paytable can be added to the payout for the additional wager, producing a second paytable which contains the total amount a player will win based on the combined wagers.

In yet another embodiment of the present invention, when a player holds a winning hand, instead of "zeroing out" the winning hand, the winning hand can have a reduced value on the second paytable.

As previously illustrated, a payout of one hand can be transferred to another using the following formula:

$$f=(a*x+b*y-a*s*x)/(b*y),$$

wherein s is a "shrinking factor" (for a hand with probability a) and g is a "growth factor" (for a hand with probability b). A payout is zeroed out by setting s=0 and solving for f, and multiplying the growth payout by f and setting the zeroed payout to 0 (see the function in the previously supplied code, "adjustable 2," under the comment "//player is dealt J or better and holds the pair, have to 0 out rank 9 payout."

Alternatively, instead of zeroing out a hand, the hand can be given any other value (preferably a small one). For example, paying hands the player already keeps can be given a value of 1 coin (instead) of 0. In this way, the player is guaranteed to get a payout on the second paytable even if the player does not improve his or her hand. Of course, because the player is getting paid on the hand he or she already holds, the other payouts are reduced somewhat (compared to if the payout was zeroed out), according to the aforementioned algorithms. This may encourage a player to make the optional additional wager (if an option is offered), because the player knows he or she will get back at least a minimum amount of coin.

Payouts can also be rounded. For example, payouts can be rounded to the nearest 5, 10, 50, 100, etc. This may be more pleasing to a player than having payouts with seemingly arbitrary amounts such as 1438, 236, etc.

For example, to round out a payout p by 10, we can compute:

$$w=(10*\text{math.floor}(p/10)),$$

wherein w is the rounded payout, and math.floor is a library function which returns the floor of the operand.

The shrinking factor is then:

$$s=w/p;$$

s can then be substituted into formula above to compute f, and the respective payouts can be multiplied by s (the payout to be rounded), and f (the payout the excess portion is transferred to).

In this manner, payouts can be rounded when desired to produce "simpler payouts."

As described in the previous application, the second bet (doubling bet) can be mandatory instead of being optional. The player pays up front for both the initial bet and the doubled portion (i.e. the bet which pays according to the dynamic paytable). Thus, for example, if the player bet $2 up front, $1 can be bet on the standard game, and $1 can be bet on the dynamic paytable. Of course, the split does not have to be 50/50, but can be any ratio. In this embodiment, if the player holds his or her cards such that no winning combination is even possible, then the second bet can push. In other words, if a player holds all five cards dealt: 2 clubs 9 clubs 3 hearts 5 hearts 9 spades, then on the draw there is no possible winning hand. This situation can also occur when the player holds 4 "garbage" cards as well with no chance to pull a winning hand by drawing a fifth card. In this situation, the already placed second bet does not actually get placed, because there is no possible chance of a win. Thus in these circumstances, the player loses his or her original bet (after the draw) but does not win or lose the second bet. In a further variation of this embodiment, the player will lose his or her second bet when the player cannot draw to a winning hand. Further, if the player holds all five cards which comprise a winning hand, then there can be no action on the draw since the player would be guaranteed to win if action were to be taken.

In a further embodiment, the player return on the second bet does not have to be static. For example, instead of using a fixed return (e.g. 98%), the player return on the second bet can be randomly chosen from within a range (97%-99%). The player return can (or also cannot) be dependent upon the initial cards dealt, e.g. the expected value of the initial deal can be multiplied by a constant to determined the player return for the second paytable (i.e. on the second bet). Alternatively, the player return can be determined based on cards in the initial deal (e.g. if a 3 of hearts (or any heart card) is present, the player return on the second paytable can be a predetermined number).

In yet a further embodiment, the second paytable can be an aggregate of a first static paytable (for an initial bet) paytable and a dynamic amount (for a second bet). For example, the first paytable can be a standard video poker paytable, while the second paytable can be a dynamic paytable is described herein which pays on a second wager (after the initial cards are dealt and selected but before the draw) but which also includes the amount on the first paytable. Thus, if the player makes only an initial wager, the player wins an amount from the first paytable. If the player makes the initial wager and the second wager, then the player wins the amount from only the second paytable which is determined by adding the respective amount from the first paytable plus a respective dynamic payout for the second wager. In this way, when the player makes both the initial wager and the second wager, the player wins what is in the second paytable as opposed to having to add respective payouts from the first paytable and the second paytable. Ultimately, the player return on the second wager should approach a fixed amount, although this is not required.

In an additional embodiment of the present invention, the second dynamic paytable can be a bonus without having to pay for it. The first paytable can be a fixed paytable, preferably with a very high house advantage (although this is not required). The second, dynamic paytable (as described herein and in the previous application) can be "free" in the sense that the player does not have to place an additional wager to get paid on this paytable. For example, the first paytable can have an optimal player return of 80%. The second dynamic paytable can have a player return of 19%. In this way, the player gets an overall optimal return of 99%, and does not have to pay for the second paytable (either initially or after the deal).

In yet a further embodiment of the present invention, paytables can be changed during play of a game.

For example, in a video poker game, a paytable can be changed, modified, etc., after some or all of the initial cards are dealt. If all of the initial cards are not dealt, then methods described herein can be used to determine a paytable for that situation. For example, 4 cards may be dealt while leaving one face down, or else 5 cards can be dealt face up while 2 cards dealt face down (with the payout based on the best 5/7 card hand). A paytable can be generated using the methods herein (determining probabilities of getting each hand considering additional cards to be dealt). Selecting discards can also be done individually or in combination with receiving additional cards (not based on discards) to make a hand.

One example of a paytable change during play is as follows. A player is dealt an initial five card hand. If the five card hand contains at least one "2" valued card, then a "2's wild" paytable can then be used. If the five card hand does not contain a "2" valued card, then a jacks or better paytable can be used. Typically, these paytables will have to be reduced because otherwise this may give the player an advantage is standard paytables were used.

The paytable(s) for such a game can be determined as follows: choose two (or more) paytables for each paytable changing condition, cycle through all initially dealt hands and take the optimal play (considering a current paytable which may have been switched), and then average the results to determine the overall house edge for the game. If the house edge is too high, then the paytable(s) can be reduced and this can be tried again. The paytable changing condition can be based on the initial cards, and/or discards (or kept cards) chosen by the player.

In yet a further embodiment of the present invention, a video poker tournament can be implemented. The luck factor in video poker tournaments can be reduced according to this system.

A sequence of initially dealt hands (and their replacement cards) can be chosen randomly. The sequence can then be copied and stored on a storage medium (such as a CD-ROM, EPROM, etc.) Each storage medium containing the sequence can then be accessed by a plurality of respective video poker games (or any other game that uses random conditions/results/deals). Thus, each video poker machine will deal the same hands to each of the players. Alternatively, each video poker machine can be connected to a server which transmits each of hands in the sequence, wherein each video poker machine still receives the same hands during play. Typically, the same hands are dealt, the same replacement cards are dealt, in the same sequence. Thus each player who makes the same decision will receive the same replacement cards Thus, no player really has an advantage. Typically, over a large number of hands, a player's true skill will be ascertained which does not rely on luck.

The tournament can give each player an identical amount of money to start (i.e. $1000), and after a terminating condition the tournament ends and the player(s) with the most money wins. The terminating condition can be when a period of time expires, when a predetermined number of hands are played, or when the player reaches a predetermined amount of money. Preferably, all players are given a fixed amount of money and the tournament will end after a predetermined amount of time (i.e. 90 minutes). The player with the most money at that time is deemed the winner.

Figure 5:
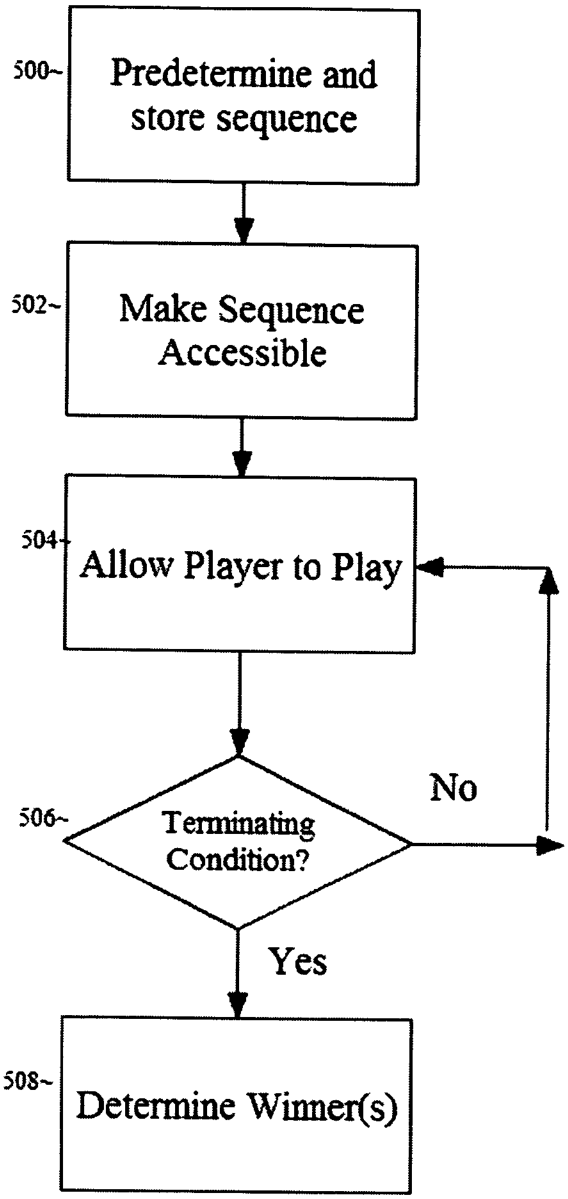
FIG. 5 is a flowchart illustrating a method of implementing a video poker tournament, according to an embodiment of the present invention.

FIG. 5 is a flowchart illustrating a method of implementing a video poker tournament, according to an embodiment of the present invention.

The method starts with operation 500, which predetermines a sequence of random hands and replacement cards. This determination is performed using conventional methods (i.e. using a standard deck (or variant) and using a random number generator to choose cards).

From operation 500, the method proceeds to operation 502 which makes the sequence accessible to a plurality of video poker machines. This can be done my using copies of the sequence for each machine or connecting each machine through a computer communications network to a server which serves the sequences. If this latter method is utilized, the hands can be served as needed, in batches with a buffer on each video poker machine, or all at once.

From operation 502, the method proceeds to operation 504 which allows player to play hand(s) using the predetermined sequence. Thus all players typically have the same "luck."

From operation 504, the method proceeds to operation 506, which checks if there is a terminating condition. If there is no terminating condition, then the method proceeds to operation 504 which continues the tournament.

If the check in operation 506 determines that there is a terminating condition, then the method proceeds to operation 508 which ends the tournament. Winner(s) are also typically determined.

Such a tournament should determine which player has the best skill (knows the best strategy and/or plays quickly), and such a tournament would generate more publicity for the game of video poker.

The above method is not limited to video poker, and an analogous method can be used for other tournaments as well, such as slots, blackjack, etc. In a further (less preferred) embodiment, a majority (but not all) of the hands can be predetermined, and/or some or all of the replacement cards need not be predetermined but can differ from machine to machine, thus giving some element of "luck" into the tournament.

In a further embodiment of the present invention, a further variation of the multi-spin slot game can be implemented. The previously described variation described spinning additional reels conditionally dependent upon whether a winning combination can be formed. Alternatively, the further reels can be spun even though no winning combination is possible. In this way, for example, if a game configuration has 1/3/9 reels (from left to right, as in the figures), then 9 lines of the game will typically always be spun (i.e. 13 reels), regardless of the outcome of any of the reels. Of course, other configurations can be used as well, as long as all reels comprising each line are spun. Winning combinations are determined as previously described.

It is also noted that any and/or all of the above embodiments, configurations, variations of the present invention described above can mixed and matched and used in any combination with one another. Any claim herein can be combined with any others (unless the results are nonsensical). Further, any mathematical formula given above also includes its mathematical equivalents, and also variations thereof such as multiplying any of the individual terms of a formula by a constant(s) or other variable.

Moreover, any description of a component or embodiment herein also includes hardware, software, and configurations which already exist in the prior art and may be necessary to the operation of such component(s) or embodiment(s).

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A video poker game apparatus configured to implement a video poker game, the video poker game apparatus comprising:

an electronic output device configured to display the video poker game;

at least one input device configured to provide inputs to the video poker game;

a non-transitory memory device storing a paytable approved by a regulatory authority and computer-readable instructions to facilitate play of the video poker game;

an electronic processor connected to the output device, the at least one input device, and the non-transitory memory device, the electronic processor configured to execute the computer readable instructions stored on the non-transitory memory device which cause the electronic processor to:

initiate the video poker game, wherein the video poker game is a game of chance approved by the regulatory authority;

receive a monetary wager for play of the video poker game;

display, in the video poker game, an array of concealed elements, wherein the concealed elements are associated with fifty-two different cards representing each card in a conventional deck of cards and a plurality of concealed termination cards, which are all displayed simultaneously in a concealed state;

enable a player, via the at least one input device, to continuously reveal a sequence of the concealed elements, wherein the sequence of concealed elements are switched from the concealed state to a revealed state, the revealed state revealing an identity of each card associated therewith;

simultaneously, during the continuous reveal, highlight only the cards in the revealed state that comprise a highest ranking five card combination in accordance with the paytable out of all five card combinations of the cards in the revealed state until one of the termination cards is switched to the revealed state;

after one of the termination cards is switched to the revealed state, determine and award to the player a monetary award based on the highest ranking five card combination of the cards in the revealed state.

* * * * *